United States Patent [19]

Thorén

[11] 4,184,856
[45] Jan. 22, 1980

[54] METHOD FOR THE UTILIZATION OF THE HEAT ENERGY OF SEWAGE

[76] Inventor: Torgny A. Thorén, 23, Namndemansvägen, Sollentuna, Sweden

[21] Appl. No.: 882,736

[22] Filed: Mar. 2, 1978

[51] Int. Cl.² .............................................. F24J 3/04
[52] U.S. Cl. ........................................... 55/52; 55/55; 55/80; 210/71; 210/180; 261/128; 165/DIG. 12
[58] Field of Search ............... 210/2, 12, 15, 71, 63 R, 210/175, 180, 170, 152; 165/DIG. 12, 2, 1; 261/128; 55/80, 52, 55, 84, 95

[56] References Cited

U.S. PATENT DOCUMENTS

| | | | |
|---|---|---|---|
| 2,563,262 | 8/1951 | Moore | 210/170 |
| 3,607,737 | 9/1971 | Gamer | 210/12 |
| 3,892,660 | 7/1975 | Romell | 210/12 |
| 4,000,064 | 12/1976 | Romell et al. | 210/12 |

FOREIGN PATENT DOCUMENTS

48893 1/1919 Sweden .
78757 2/1919 Switzerland .

*Primary Examiner*—Benoît Castel
*Attorney, Agent, or Firm*—Hill, Van Santen, Steadman, Chiara & Simpson

[57] ABSTRACT

A domestic sewage system discharges hot sewage from several sources in a building such as a home to a sewer. The home is here provided with a fan in the sewer vent to draw air from an air inlet in the sewer, through the sewer where the air becomes heated, and then through a heat exchanger where heat is removed from the air such as for room or water heating, and then out through the sewer vent.

4 Claims, 4 Drawing Figures

4,184,856 ered annually from an average
one-family house by way of the sewage disposed of
through the municipal sewer system. Much of this heat
energy is lost through the air vent of the house's sewage
system, it being common practice to provide a vent pipe
opening to the atmosphere above the roof of the house
for the ventilation of the sewage system of the house.

Heretofore, the heat energy from sewage from a
dwelling-house has been used for the preheating of hot
fresh water consumed in the same house. To this end, a
heat exchanger was provided in the basement of the
house and in this heat exchanger, the sewage and the
cold fresh water are passed through separate conduit
systems. However, the amounts of energy which can be
recovered in this way from the sewage are seldom large
enough to justify the costs for the installation and maintenance of the heat exchanger.

SUMMARY OF THE INVENTION

In accordance with the present invention, heat energy in domestic sewage is utilized by passing a flow of air through the sewage conduit from one or more inlets on the conduit to a place of utilization with the air flowing in countercurrent relation and in direct contact with the sewage, removing heat from the flow of air by means of a heat exchanger, and utilizing the removed heat for heating purposes, said removal of heat and utilization of the removed heat taking place at the place of utilization.

The method according to the invention is advantageously carried out using the vent pipe of the sewage system of the house. In this pipe, which opens above the roof, a fan for producing the airflow and a heat exchanger conducting the airflow are provided.

The invention can be realized using little extra equipment in the house where a heat pump is used, because the evaporator of the heat pump may then be used as the heat exchanger for the removal of heat from the airflow. Thus, a separate heat exchanger is not necessary in such instance.

Other features and advantages of the invention will become apparent from the following specification taken in conjunction with the accompanying diagrammatic drawing.

ON THE DRAWINGS

AS SHOWN ON THE DRAWINGS

Figure 1:
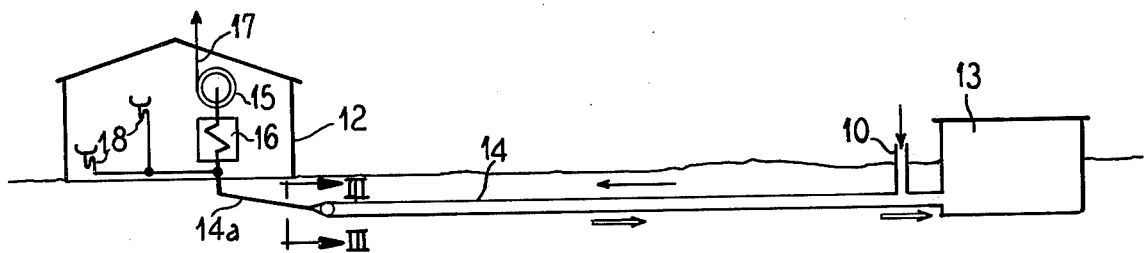
FIG. 1 is a diagrammatic elevational view of a one-family dwelling-house and an underground sewer conduit extending from the house to a sewage purification installation.
Figure 2:
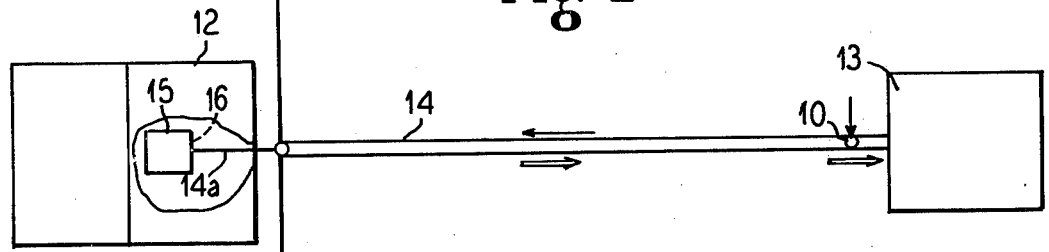
FIG. 2 is a plan view corresponding to FIG. 1.
Figure 2:
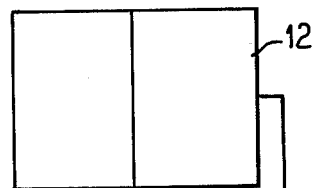

In accordance with the present invention, an exemplary system shown in the drawing comprises at least one air inlet 10 on a sewer conduit 14 extending from a house 12 to a purification plant 13. The sewer conduit 14 may be a part of a municipal sewer system and is connected with the sewer system of the house through a connecting conduit 14a. As shown in FIG. 2, several houses 12 may be connected with the sewer conduit 14.

A fan 15 is disposed in a sewer vent 17 in the house in series with a heat exchanger 16. The fan 15 produces an airflow which passes through the sewer conduit 14 in countercurrent relation and in direct contact with the flowing sewage therein and which then passes through the heat exchanger 16 in the house 12. In the heat exchanger 16, which preferably is an evaporator of a heat pump, heat is removed from the airflow, which has become heated by absorbing heat from the sewage in the sewer conduit, and used for heating purposes, e.g. for room heating and/or for heating water for tapping. The airflow is then exhausted into the atmosphere above the roof. Any water condensed as a consequence of the cooling of the airflow is carried off from the heat exchanger in any suitable manner.

The fan 15 producing the airflow causes a partial vacuum in the sewage system of the house and it may in some cases be necessary or advisable to make provisions to reduce the partial vacuum sufficiently to avoid interference with the function of water traps 18 in the sewage system.

Figure 4:
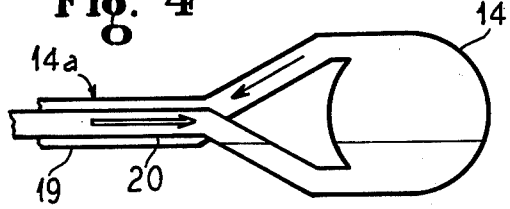
FIG. 4 is an enlarged diagrammatic view of a portion of FIG. 1.
Figure 3:
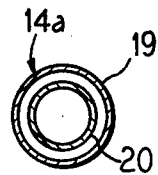
FIG. 3 is a cross-sectional diagram at line III—III of FIG. 1.

The connection conduit 14a between the house 12 and the sewer conduit 14, (the latter being relatively large in diameter and therefore almost always only partially filled with sewage, so that it can also convey the airflow) is advantageously formed by two concentric tubes 19,20 (FIGS. 3 and 4) the sewage flowing through the inner tube 20 and the air flowing through the outer tube 19.

If the heat exchanger 16 is part of a heat pump used for the heating of the house by recovering the heat in the exhaust air of the sewer ventilation system, it is necessary to produce the airflow through the sewer conduit by the fan 15 only during those periods of the winter season in which the heat energy in the connectively flowing exhaust air is insufficient to meet the heat energy demand of the house. During the other periods of the winter season and in the summer, the fan producing the airflow through the sewer conduit may be switched off, but any required heat energy is then taken from the sewage vent air of the house. During the off-periods of the fan, the heat energy of the sewage is partly stored in the ground about the sewer conduit 14 to be recovered when the fan 15 is again switched on.

Although various minor modifications might be suggested by those versed in the art, it should be understood that I wish to embody within the scope of the patent warranted hereon, all such embodiments as reasonably and properly come within the scope of my contribution to the art.

I claim as my invention:
1. A method for the utilization of the heat energy of sewage flowing through a sewer conduit, comprising:
 (a) producing an airflow passing through the sewer conduit from at least one air inlet on the sewer conduit to a place of utilization remote from the air inlet in countercurrent relation and in direct contact with the flowing sewage;
(b) separating the air flow from any sewage flow between the sewer conduit and a heat exchanger;
(c) removing heat from the airflow by means of the heat exchanger; and
(d) utilizing such heat for heating purposes, the removal and utilization of the removed heat taking place at the place of utilization.

2. A method according to claim 1, including discharging the airflow through a sewage vent in the place of utilization.

3. A method according to claim 1, including assisting the airflow by a fan.

4. A method according to claim 1, wherein said separating is carried out while still keeping said flows in heat transfer relation to each other.